US010768692B2

(12) United States Patent
Kim et al.

(10) Patent No.: US 10,768,692 B2
(45) Date of Patent: Sep. 8, 2020

(54) SYSTEMS AND METHODS FOR CAPTURING AND RENDERING HAND SKELETONS OVER DOCUMENTS IMAGES FOR TELEPRESENCE (71) Applicant: FUJI XEROX CO., LTD., Tokyo (JP)

(72) Inventors: Chelhwon Kim, Palo Alto, CA (US); Patrick Chiu, Mountain View, CA (US); Joseph Andrew Alkuino de la Pena, Yokohama (JP); Laurent Denoue, Verona (IT); Jun Shingu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 54 days.

(21) Appl. No.: 15/901,888

(22) Filed: Feb. 21, 2018

(65) Prior Publication Data
US 2019/0258311 A1 Aug. 22, 2019

(51) Int. Cl.
G09G 5/00 (2006.01)
G06F 3/01 (2006.01)
G06T 11/60 (2006.01)

(52) U.S. Cl.
CPC .............. *G06F 3/011* (2013.01); *G06F 3/017* (2013.01); *G06T 11/60* (2013.01)

(58) Field of Classification Search
CPC .......... G06F 3/011; G06F 3/017; G06F 3/042; G06F 3/0425; G06T 11/60
See application file for complete search history.

(56) References Cited
U.S. PATENT DOCUMENTS

2005/0047683 A1* 3/2005 Pollard ................. G06F 3/0425
382/306
2012/0218395 A1* 8/2012 Andersen ................. G06F 3/017
348/77
2012/0320158 A1* 12/2012 Junuzovic ............... G06F 3/017
348/46
2013/0329247 A1* 12/2013 Takabatake ........ H04N 1/00408
358/1.15
2015/0324001 A1* 11/2015 Yanai ..................... G06F 3/0304
345/156
2017/0094018 A1* 3/2017 Ekstrom ................. H04L 67/20
2017/0310920 A1 10/2017 Chiu et al.

OTHER PUBLICATIONS

ShadowHands: High-Fidelity Remote Hand Gesture Visualization using a Hand Tracker, ISS 2016, Nov. 6-9, 2016, Niagara Falls, ON, Canada, ACM ISBN 978-1-4503-4248-3/16/11.

* cited by examiner

*Primary Examiner* — Adam R. Giesy
(74) *Attorney, Agent, or Firm* — Procopio, Cory, Hargreaves & Savitch LLP (57) ABSTRACT

In a telepresence scenario with remote users discussing a document or a slide, it can be difficult to follow which parts of the document are being discussed. One way to address this problem is to provide feedback by showing where the user's hand is pointing at on the document, which also enables more expressive gestural communication than a simple remote cursor. An important practical problem is how to transmit this remote feedback efficiently with high resolution document images. This is not possible with standard videoconferencing systems which have insufficient resolution. We propose a method based on using hand skeletons to provide the feedback. The skeleton can be captured using a depth camera or a webcam (with a deep network algorithm), and the small data can be transmitted at a high frame rate (without a video codec).

22 Claims, 8 Drawing Sheets

SYSTEMS AND METHODS FOR CAPTURING AND RENDERING HAND SKELETONS OVER DOCUMENTS IMAGES FOR TELEPRESENCE

BACKGROUND OF THE INVENTION

Technical Field

The disclosed embodiments relate in general to systems and methods for remote interaction between users and, more specifically, to systems and methods for capturing and rendering hand skeletons over documents images for telepresence.

Description of the Related Art

In a telepresence scenario where remote users are having a discussion over a document or a slide, it can be difficult to follow the discussion. Typically, the live view of the images of the document is shown in its own window, separate from the views of the video images of the remote users' faces and bodies, see FIGS. 1(a), 1(b), 1(c), 1(d) and 1(e). When a user is talking about or referring to different parts of the document, it is difficult to follow which part is being discussed.

One solution is to provide a telepointer, which is a remote graphical cursor, but this has drawbacks in that if the cursor is too small it is difficult to see in a teleconference setting, and if the cursor is too large it causes too much occlusion of the content. Furthermore, a graphical cursor is not very expressive. With respect to the interaction, if the cursor is controlled using a mouse, the interaction is not as simple and direct as the user pointing at a part of the document.

Figure 2A:
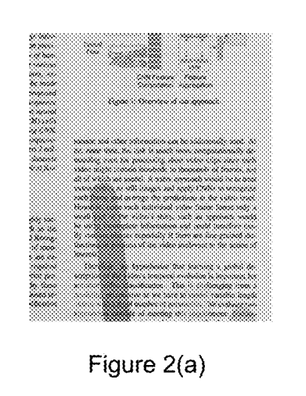
FIGS. 2(a) and 2(b) illustrate: (a) close-up of high-resolution captured document with the rendered skeleton, (b) skeleton data is represented by line segments before thickening and making translucent.
Figure 2B:
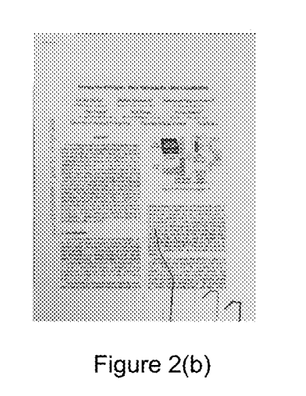

A better solution is to allow the user to point at parts of the document, and use a videoconferencing system to show this at the remote site, see, for example, FIGS. 2(a) and 2(b). However, existing standard videoconferencing technologies do not support sufficiently high resolution to read the document page. Thus, an important practical problem is how to transmit hand movements efficiently along with high-resolution document images. Therefore, new and improved systems and methods are needed.

SUMMARY OF THE INVENTION

The embodiments described herein are directed to methods and systems that substantially obviate one or more of the above and other problems associated with conventional telepresence technology.

In accordance with one aspect of the inventive concepts described herein, there is provided a computer-implemented method, the method being performed in a computerized system incorporating a camera and a central processing unit, the computer-implemented method involving: using the camera to track a hand of a user and a document on a surface to obtain user hand data and document tracking data; using the camera to capture a high-resolution image of the document based on the document tracking data; transmitting the high-resolution image of the document to a remote computing system; transmitting the obtained user hand data to the remote computing system; and on the remote computing system, rendering a representation of the user hand data interposed over the high-resolution image of the document.

In one or more embodiments, the user hand data is separate and distinct from the high-resolution image of the document.

In one or more embodiments, the user hand data comprises coordinates of hand joints of the user.

In one or more embodiments, the user hand data comprises coordinates of 21 hand joints of the user.

In one or more embodiments, the user hand data is normalized.

In one or more embodiments, the user hand data is hand skeleton data.

In one or more embodiments, the method further comprises rectifying the captured high-resolution image of the document.

In one or more embodiments, the method further comprises cropping the captured high-resolution image of the document.

In one or more embodiments, the camera is a web camera.

In one or more embodiments, the camera is a depth camera.

In one or more embodiments, rendering the representation of the user hand data comprising generating a virtual shadow of the user hand.

In one or more embodiments, the rendering of the virtual shadow is based on a distance between the user hand and the document.

In one or more embodiments, the distance between the user hand and the document is determined using a depth camera.

In one or more embodiments, the method further comprises repeating steps c., d. and e. in a loop.

In one or more embodiments, the method further comprises repeating steps a. and b. when the document is changed.

In one or more embodiments, the rendering is performed in a web browser.

In one or more embodiments, the hand of the user is tracked using a deep learning based hand pose estimator.

In one or more embodiments, the rendering a representation of the user hand data comprises rescaling and translating the user hand data.

In accordance with another aspect of the inventive concepts described herein, there is provided a non-transitory computer-readable medium embodying a set of computer-executable instructions, which, when executed in connection with a computerized system incorporating a central processing unit and a camera, cause the computerized system to perform a method involving: using the camera to track a hand of a user and a document on a surface to obtain user hand data and document tracking data; using the camera to capture a high-resolution image of the document based on the document tracking data; transmitting the high-resolution image of the document to a remote computing system; transmitting the obtained user hand data to the remote computing system; and on the remote computing system, rendering a representation of the user hand data interposed over the high-resolution image of the document.

In accordance with yet another aspect of the inventive concepts described herein, there is provided a computerized system incorporating a central processing unit, a camera and a memory, the memory storing a set of computer-readable instructions causing the computerized system to perform a method involving: using the camera to track a hand of a user and a document on a surface to obtain user hand data and document tracking data; using the camera to capture a high-resolution image of the document based on the document tracking data; transmitting the high-resolution image of the document to a remote computing system; transmitting the obtained user hand data to the remote computing system; and on the remote computing system, rendering a representation of the user hand data interposed over the high-resolution image of the document.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided systems and methods based on using hand skeletons to furnish the feedback during a remote user interaction. In various embodiments, the skeleton is captured using a depth camera or a webcam (with a deep network algorithm), and the small data is transmitted at a high frame rate (without a video codec). In conjunction, the document image is captured with a high-resolution camera and transmitted only when the document page is changed. Both the skeleton data and the document image is handled with a lightweight client software application executing on a web browser at the remote sites.

Figure 3:
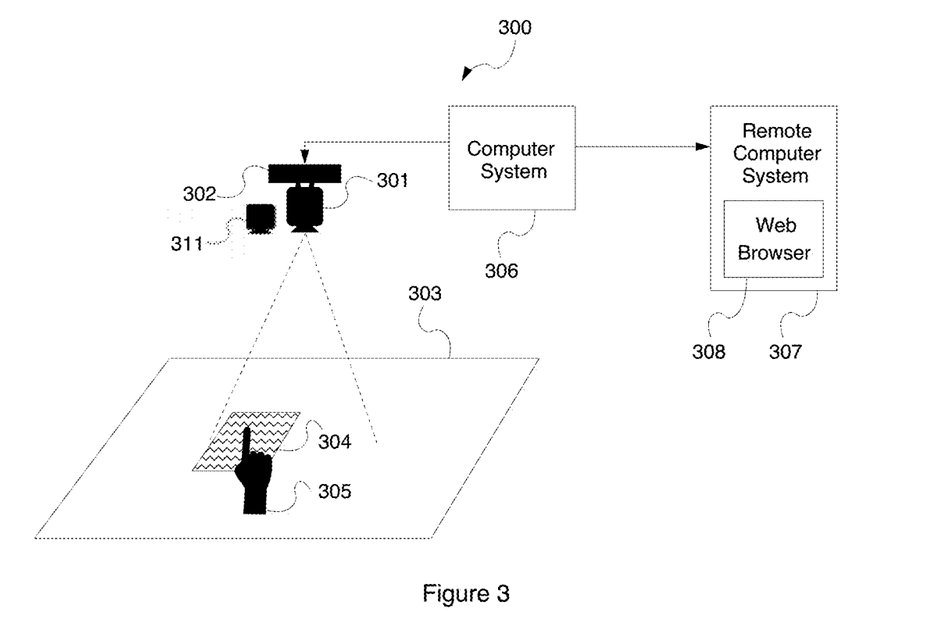
FIG. 3 illustrates an exemplary embodiment of a computerized system for capturing and rendering hand skeletons over document images for telepresence.

FIG. 3 illustrates an exemplary embodiment of a computerized system 300 for capturing and rendering hand skeletons over document images for telepresence. In one embodiment, the described system uses a high-resolution camera 301 installed above the desk to capture high resolution document page images. Optionally, the camera 301 may be mounted on a tilt mount 302. In addition to the high-resolution camera 301, a second camera 311, which may be a webcam or a depth camera may be provided, also mounted above the desk to capture video frames of user's hands 305 interacting with a document page 304. The image data acquired by the camera 311 is transmitted to computer system 306 for processing described in detail below. Finally, the processed data is transmitted over a computer network to a remote computer system 307, executing a browser application 308, which is used to display the data to the remote user. In an alternative embodiment, just one camera may be used for both document capture and hand tracking.

Figure 4:
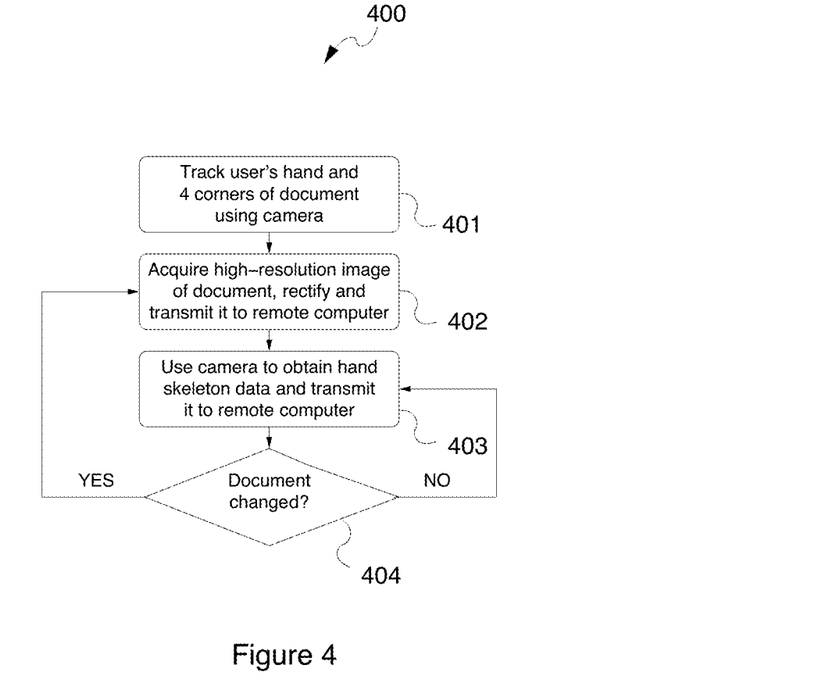
FIG. 4 illustrates an exemplary operating sequence of an embodiment of a computerized system for capturing and rendering hand skeletons over document images for telepresence.

FIG. 4 illustrates an exemplary operating sequence 400 of an embodiment of a computerized system for capturing and rendering hand skeletons over document images for telepresence. At step 401, hand skeletons and the document page's boundary are tracked in near real time. In one embodiment, the aforesaid tracking may be performed, for example, at a rate of 6 frames per second. In one embodiment, the aforesaid tracking may be performed using state-of-the-art deep learning based, for example, on a hand pose estimator Hand3D described in Zimmermann, C., Brox, T. Learning to Estimate 3D Hand Pose from Single RGB Images. arXiv:1705.01389v1 [cs.CV] 3 May 2017 as well as a document detection method provided by DropBox, Inc., both of which are well-known in the art. In one embodiment, DropBox's document detection method is implemented in Python with OpenCV 3.2 and runs at 12 fps for detecting a document page in a simple background. A Python and TensorFlow implementation of Hand3D is available on the author's webpage and runs at 15 fps on a desktop with a GPU. The resulting frame rate is 6 fps.

At step 402, a rectified and cropped document page image in a high-resolution quality is captured by the camera 301 and prepared for transmission to the server using, for example, a system described in Kim, C., Chiu, P., Tang, H. High-quality capture of documents on a cluttered tabletop with a 4K video camera. Proceedings of ACM DocEng 2015, pp. 219-222 as well as U.S. patent application Ser. No. 14/637,391. Finally, in the same step 402, the high-resolution document page image is transmitted to the remote computer system 307.

At step 403, both the hand skeleton data is captured using the camera 301 based on the results of the aforesaid tracking and processed. In one or more embodiments, the captured skeleton data comprises a set of numbers describing the line segments forming the hand skeleton. As would be appreciated by persons of ordinary skill in the art, the aforesaid skeleton data is relatively compact and, consequently, can be transmitted via a data network at a high frame rate, without the need of employing a video codec.

As would be appreciated by persons of ordinary skill in the art, the high-resolution document image is static and needs to be captured by the camera 301 only once. A new document image needs to be re-captured only when the document page has been changed, see step 404 in FIG. 4. Consequently, because the image of the document is static, it needs to be transmitted to the remote server only once and a subsequent transmission needs to take place only when the document page changes. This greatly saves the required network bandwidth as well as the processing resources on the remote client.

Figure 5:
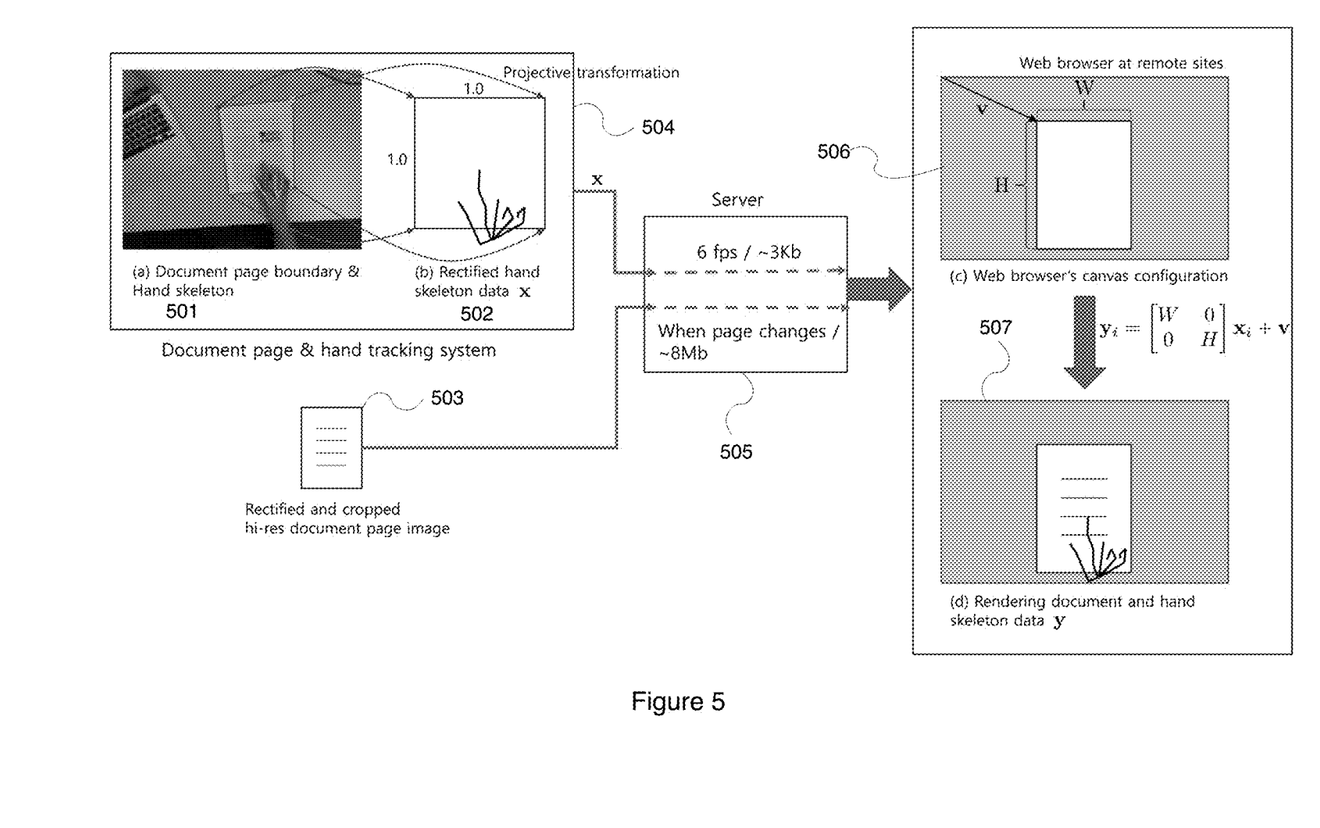
FIG. 5 illustrates an exemplary pipeline for capturing and transmitting the hand skeleton data as well as the high-resolution document image data for subsequent rendering on the remote computer system.

Once the hand skeleton data and the high-resolution document image data are received via the data network by the remote computing system 307, the respective data is interposed and the resulting visual representation of the document and the user's hand is rendered and displayed to the user(s). Because the high-resolution document image data is static and the hand skeleton data is relatively compact, in one embodiment, rendering of both the hand skeleton data and the high-resolution document image can be handled using a lightweight client application executing on a web browser at the remote computer system. FIG. 5 illustrates an exemplary pipeline for capturing and transmitting the hand skeleton data 502 as well as the high-resolution document image data 503 for subsequent rendering on the web browser canvas 506, 507 on the remote computer system 307. In one embodiment, the high-resolution document image data (when the document page changes) and the hand skeleton data are transmitted through the server 505.

Figure 6A:
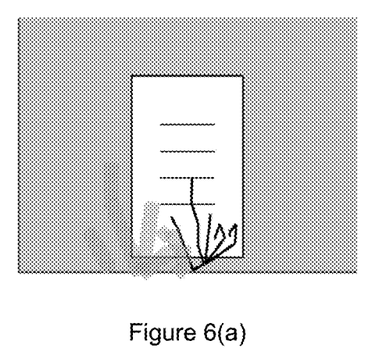
FIGS. 6(a) and 6(b) illustrate using artificial shadow for better understanding of distance of the hand from the paper and providing a 3D effect for better telepresence.
Figure 6B:
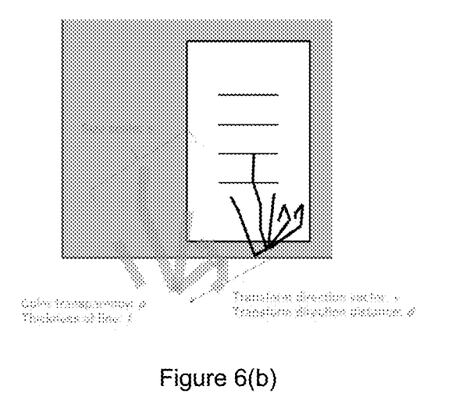

In one or more embodiments, upon rendering of the resulting overlay at the remote computer system 307, the 3D telepresence effect may be enhanced by additionally providing a representation of a shadow of the human hand, see, for example, FIGS. 6(*a*) and 6(*b*).

In one or more embodiments, in order to render the hand skeleton from a perspective image on the rectified high-resolution document page image, the hand skeleton data needs to be rectified before it is transmitted to the remote computer system 307. Furthermore, because the scale of the high-resolution document page image rendered on the remote users' web browser 308 can be varied at the remote computer system 307, the described system transmits normalized hand skeleton data and permits the remote side to choose the appropriate scale for the final rendering. In one embodiment, the system uses a projective transformation (for the perspective distortion removal) between the tracked document page boundary and a canonical square box (for the normalization). In one exemplary embodiment, the hand skeleton data 502 comprises 21 joints of hand and each joint (a point in the perspective image) is mapped by this projective transformation 504, see FIG. 5.

Figure 1A:
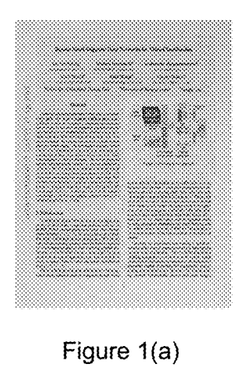
FIGS. 1(a), 1(b), 1(c), 1(d) and 1(e) illustrate various options for viewing remote hand feedback over paper document page, including: (a) no feedback, (b) video of hand interacting with document, (c), (d), (e) detected skeleton transmitted and rendered on hi-res captured document image.
Figure 1B:
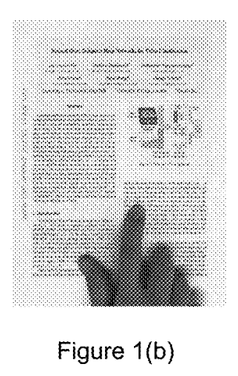
Figure 1C:
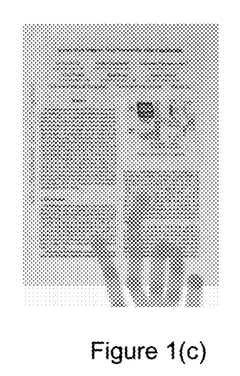
Figure 1D:
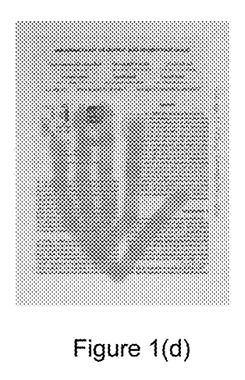
Figure 1E:
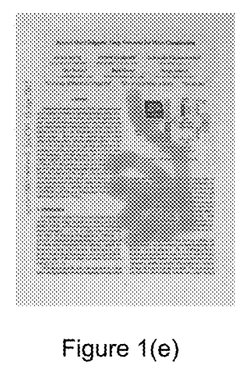

In one or more embodiments, at the remote computer system 307, the transmitted high-resolution document page image is rendered on a canvas of the web browser 308, and based on its dimensions and location on the canvas ((W, H) and v in FIG. 5, respectively), the normalized hand skeleton data is rescaled and translated. In one or more embodiments, because the data size of the hand skeleton is small (21 float data type 2-vectors) it can be transmitted at a relatively high frame rate whereas the high resolution document page image is transmitted only when the page is changed, see step 404 in FIG. 4. A lightweight client application running on the web browser 308 at the remote computer system 307 renders the hand skeleton translucent over the high-resolution document page, as shown in FIG. 1(*c*).

In one or more embodiments, the visualization of the feedback can also be enhanced by showing a shadow. In one embodiment, an artificial shadow is added for better understanding of distance of the hand from the paper and providing a 3D effect for better telepresence, see FIGS. 6(*a*) and 6(*b*). In one embodiment, for the purposes of calculation of the shadow, the system does not rely on the 3D coordinates. As would be appreciated by persons of ordinary skill in the art, this reduces computational load and the network traffic. To this end, in one embodiment, the 2D hand skeleton is simply shifted in direction v by distance d, the size of skeleton is scaled by s, wherein d and s values are linear with respect to the distance between the hand and the document page. When the hand is closer to the document, d and s become smaller. Similarly, color transparency and line thickness of the shadow is p and t respectively; these values are also linear with respect to the distance between the hand and the document page. In one embodiment, the distance between the hand and the document page can be obtained from a depth camera, or from a webcam by estimating it by the relative sizes of the hand and the size of the paper.

In one or more embodiments, the projective transformation is obtained by applying the normalized Direct Linear Transformation (DLT) algorithm described, for example in Hartley, R. and Zisseman, A. Multiple View Geometry in Computer Vision. Cambridge University Press 2004 to the four corners of the document page, which is implemented in OpenCV, well known in the art.

In one or more embodiments, in the web browser 308, the hand skeleton data is overlaid over the document image using a number of techniques. Because the size of the high-resolution image is potentially large, rendering it into a CANVAS and drawing the hand into the same CANVAS would lower the frame rate with current browser technology. Instead, in one embodiment, the system renders the hand in an overlay that is statically positioned over the high-resolution page image. The overlay can be implemented as a CANVAS element and the hand drawn using painting commands available on the CANVAS's 2D graphics context. Alternatively, the overlay can be implemented as a dynamically generated SVG graphic. All SVG graphics primitives can be used to render the hand. Because SVG is vector based, it scales nicely on any screen resolution; with the CANVAS implementation, high resolution displays (such as retina displays found on iOS devices) would require scaling the CANVAS to 3× the visible pixel size, which would again slow down the frame rate. Besides SVG, the overlay could also use WebGL: its 3D drawing API could for example be used to render the 3d hand model with more realistic rendering options, for example to recreate cast shadows over the page image without having to use low-level graphics primitives from SVG or CANVAS's 2D graphics context.

Additionally, in one or more embodiments, the hand skeleton can be rendered over the document page image using HTML elements, such as <DIV>, well known in the art. Combined with CSS transforms, each hand segment can be rotated and moved in real time using the appropriate transform. Furthermore, CSS opacity values and gradients can be used to modify the texture of each hand segment. Shadows can also be implemented by creating more elements underneath the main DIV elements. This approach is broadly available and is vector-based so it scales natively on any display resolution without taxing the frame rate.

Exemplary Computer Platform

Figure 7:
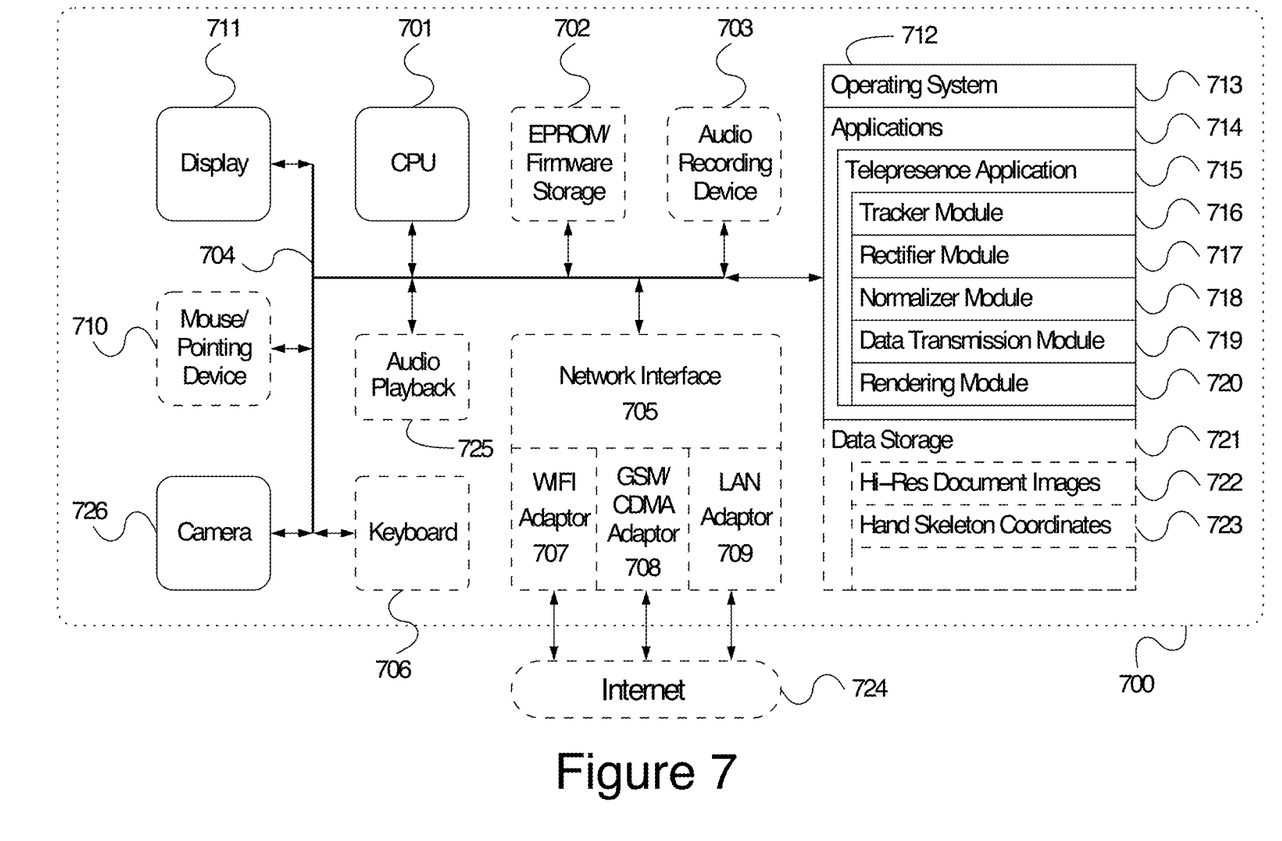
FIG. 7 illustrates an exemplary embodiment of a computerized system for capturing and rendering hand skeletons over documents images for telepresence.

FIG. 7 illustrates an exemplary embodiment of a computerized system 700 for capturing and rendering hand skeletons over documents images for telepresence. In one or more embodiments, the computerized system 700 may be implemented within the form factor of a desktop computer well known to persons of skill in the art. In an alternative embodiment, the computerized system 700 may be implemented based on a laptop or a notebook computer or any other mobile computing device, such as a smartphone or a tablet computer.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 711, which may be also electrically coupled to the data bus 704, for displaying various information to a user of the computerized system 700, such as the user interfaces showing the predicted user attention state. In an alternative embodiment, the display device 711 may be associated with a graphics controller and/or graphics processor (not shown). The display device 711 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 711 may be incorporated into the same general enclosure with the remaining components of the computerized system 700. In an alternative embodiment, the display device 711 may be positioned outside of such enclosure, such as on the surface of a table or a desk. In one or more embodiments, the computerized system 700 may further incorporate an audio capture device 703, such as a microphone.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701 and for controlling cursor movement on the display 711. This input device typically has two degrees of freedom in two axes, a first axis (e.g., x) and a second axis (e.g., y), that allows the device to specify positions in a plane.

The computerized system 700 may further incorporate a web camera 726, as well as a keyboard 706, which all may be coupled to the data bus 704 for communicating information, including, without limitation, images and video, as well as user commands (including gestures) to the processor 701. The web camera 726 may be used for tracking of the document corners on the tabletop, capturing high-resolution images of the document pages as well as obtaining hand skeletons coordinates.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 709. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 709 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 709 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 709 send and receive electrical or electromagnetic signals that carry digital data streams representing various types of information.

In one or more embodiments, the Internet 724 typically provides data communication through one or more sub-networks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1501 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700. Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display the graphical user interface(s) on the display device 711 or perform capturing or rendering hand skeletons over documents images for telepresence. In one or more embodiments, the applications 714 may include an inventive application 715 for capturing hand skeletons over documents images for telepresence.

3. Data storage 721 may store, for example, various data structures used in capturing or rendering hand skeletons over documents images for telepresence, such as high-resolution document image data 722 and hand skeleton coordinate data 723.

In one or more embodiments, the inventive application 715 for capturing and rendering hand skeletons over documents images for telepresence incorporates tracker module 716, rectifier module 717, normalizer module 718, data transmission module 719, as well as rendering module 720.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for capturing and rendering hand skeletons over documents images for telepresence. It is intended that the specification and examples be considered as exemplary only, with a true scope and spirit of the invention being indicated by the following claims.

What is claimed is:

1. A computer-implemented method, the method being performed in a computerized system comprising a first camera, a second camera, and a central processing unit, the computer implemented method comprising:
   a. using the first camera to track a hand of a user and a document on a surface to obtain user hand data and document tracking data;
   b. using the second camera to capture a high-resolution image of the document based on the document tracking data;
   c. transmitting the high-resolution image of the document to a remote computing system;
   d. transmitting the obtained user hand data to the remote computing system;
   e. on the remote computing system, rendering a representation of the user hand data interposed over the high-resolution image of the document; and
   f. when the document is changed, repeating steps b. and c. only in response to the change.

2. The computer-implemented method of claim 1, wherein the user hand data is separate and distinct from the high-resolution image of the document.

3. The computer-implemented method of claim 1, wherein the user hand data comprises coordinates of hand joints of the user.

4. The computer-implemented method of claim 3, wherein rendering the representation of the user hand data comprises:
   generating a graphical visualization of the hand of the user based on the user hand data and document tracking data; and
   interposing the only graphical visualization of the hand of the user over the high-resolution image of the document.

5. The computer-implemented method of claim 1, wherein the user hand data comprises coordinates of 21 hand joints of the user.

6. The computer-implemented method of claim 1, wherein the user hand data is normalized.

7. The computer-implemented method of claim 1, wherein the user hand data is hand skeleton data.

8. The computer-implemented method of claim 1, further comprising rectifying the captured high-resolution image of the document.

9. The computer-implemented method of claim 1, further comprising cropping the captured high-resolution image of the document.

10. The computer-implemented method of claim 1, wherein the first camera is a web camera.

11. The computer-implemented method of claim 1, wherein the second camera is a depth camera.

12. The computer-implemented method of claim 1, wherein rendering the representation of the user hand data comprising generating a virtual shadow of the user hand.

13. The computer-implemented method of claim 12, wherein the rendering of the virtual shadow is based on a distance between the user hand and the document.

14. The computer-implemented method of claim 13, wherein the distance between the user hand and the document is determined using a depth camera.

15. The computer-implemented method of claim 1, further comprising repeating steps a., d. and e. in a loop.

16. The computer-implemented method of claim 1, wherein the rendering is performed in a web browser.

17. The computer-implemented method of claim 1, wherein the hand of the user is tracked using a deep learning based hand pose estimator.

18. The computer-implemented method of claim 1, wherein the document tracking data comprises coordinates of four corners of the document.

19. The computer-implemented method of claim 18, wherein the user hand data comprises coordinates of the hand of the user relative to the four corners of the document and does not include an image of the document.

20. The computer-implemented method of claim 1, wherein the rendering a representation of the user hand data comprises rescaling and translating the user hand data.

21. A non-transitory computer-readable medium embodying a set of computer-executable instructions, which, when executed in connection with a computerized system comprising a central processing unit and a first camera and a second camera, cause the computerized system to perform a method comprising:
   a. using the first camera to track a hand of a user and a document on a surface to obtain user hand data and document tracking data;
   b. using the second camera to capture a high-resolution image of the document based on the document tracking data;
   c. transmitting the high-resolution image of the document to a remote computing system;
   d. transmitting the obtained user hand data to the remote computing system;
   e. on the remote computing system, rendering a representation of the user hand data interposed over the high-resolution image of the document; and
   f. when the document is changed, repeating steps b. and c. only in response to the change.

22. A computerized system comprising a central processing unit, a first camera, a second camera, and a memory, the memory storing a set of computer-readable instructions causing the computerized system to perform a method comprising:
   a. using the first camera to track a hand of a user and a document on a surface to obtain user hand data and document tracking data;
   b. using the second camera to capture a high-resolution image of the document based on the document tracking data;
   c. transmitting the high-resolution image of the document to a remote computing system;
   d. transmitting the obtained user hand data to the remote computing system;
   e. on the remote computing system, rendering a representation of the user hand data interposed over the high-resolution image of the document; and
   f. when the document is changed, repeating steps b. and c. only in response to the change.

* * * * *